United States Patent [19]
Pan et al.

[11] Patent Number: 5,566,259
[45] Date of Patent: Oct. 15, 1996

[54] DUAL STAGE OPTICAL DEVICE WITH LOW POLARIZATION MODE DISPERSION

[75] Inventors: Jing-Jong Pan; Ming Shih, both of Milpitas; Jingyu Xu, San Jose, all of Calif.

[73] Assignee: E-Tek Dynamics, Inc., San Jose, Calif.

[21] Appl. No.: 354,706

[22] Filed: Dec. 13, 1994

[51] Int. Cl.$^6$ ............................................. G02B 6/27
[52] U.S. Cl. ........................... 385/11; 359/497; 385/15; 385/31
[58] Field of Search ................... 385/11, 15, 27, 385/31–35, 39; 359/487, 488, 494, 497–501

[56] References Cited

U.S. PATENT DOCUMENTS

| | | | |
|---|---|---|---|
| 4,762,384 | 8/1988 | Hegarty et al. | 385/11 |
| 5,082,343 | 1/1992 | Coult et al. | 385/34 |
| 5,208,876 | 5/1993 | Pan | 385/11 |
| 5,317,655 | 5/1994 | Pan | 385/11 |

*Primary Examiner*—John D. Lee
*Attorney, Agent, or Firm*—Townsend and Townsend and Crew LLP

[57] ABSTRACT

The present invention provides for a two-stage optical isolator with reduced polarization mode dispersion. Each stage has two birefringent polarizers separated by a Faraday rotator. The polarizers in each stage are oriented with respect to each other to operate conventionally as an optical isolator for light in a backward direction. However, the polarizers in each stage are oriented with respect to the polarizers in the other stage so that a polarization mode along one direction, say, the ordinary direction, of light in the first stage travelling toward the second stage is aligned along the opposite, extraordinary, direction in the second stage and vice versa. In this manner the component of any polarization travels the same optical distance through the optical isolator to substantially reduce polarization mode dispersion.

22 Claims, 4 Drawing Sheets

DUAL STAGE OPTICAL DEVICE WITH LOW POLARIZATION MODE DISPERSION

BACKGROUND OF THE INVENTION

The present invention relates to optical fiber technology and, more particularly, to optical isolators useful in blocking reflections of optical signals generated by a laser through an optical fiber.

A recurring problem in optical fiber networks is the dispersion of the optical, i.e., light, signal in the optical fiber. Through dispersion the different components of an optical signal are spread out. For example, distance can cause dispersion of a signal traveling along an optical fiber. If left unchecked or uncompensated for, what was once a sharp signal at transmission arrives as a blurry or indefinite signal at reception. A digital signal train of logic "ones" and "zeroes" may arrive as an indistinct series of signal oscillations between "three-fourths" and "one-fourth" logic values.

Dispersion can arise from many different sources. Many of these problems have been essentially solved or avoided. However, one source which has been largely overlooked thus far is one of the common elements in a fiber optic network, the optical isolator.

In present day optical fiber technology, semiconductor lasers are typically used to generate and to relay light signals on optical fibers. These lasers are particularly susceptible to light signal reflections, which cause a laser to become unstable and noisy. Optical isolators are used to block these reflected signals from reaching the laser. Ideally, these optical isolators transmit all of the light signals in the forward direction and block all of the signals in the reverse direction.

Many of these optical isolators use the polarization modes of a light signal as a mechanism to block reflected signals. The present invention recognizes that as distances over which optical signals are transmitted lengthen and as signal transmission rates increase, these optical isolators may create dispersion problems. Stated differently, with the wide application of optical isolators in present day, high-speed optical communication networks over long distances, the problem of polarization mode dispersion is expected to become more evident.

Optical devices which addressed this problem were described in a patent application entitled, "AN OPTICAL DEVICE WITH LOW POLARIZATION MODE DISPERSION," Ser. No. 08/006,893 (now abandoned), filed Jan. 21, 1993 by two of the inventors of the present patent application and assigned to the present assignee. The present invention also solves or substantially mitigates this problem by providing for a dual stage optical isolator with reduced polarization mode dispersion.

SUMMARY OF THE INVENTION

The present invention provides for an optical isolator with a pair of optical isolator stages which connects first and second optical fibers. The isolator transmits optical signals from the first optical fiber to the second optical fiber and blocks optical signals from the second optical fiber to the first optical fiber. In each stage there are birefringent elements and a Faraday rotator. Each birefringent element has a first polarization direction and a second polarization direction. The birefringent elements in each stage are arranged with respect to the rotator in the stage so that the polarization of light signals traveling from the first optical fiber to the second optical fiber aligned along the first polarization direction in a first birefringent element is rotated and aligned along the first optical polarization direction in a second birefringent element. The polarization of light signals traveling from the second optical fiber to the first optical fiber aligned along the first polarization direction in the second birefringent element is rotated and aligned along the second optical polarization direction in the first birefringent element. This arrangement allows each optical isolator stage to operate as an optical isolator.

Furthermore, the birefringent elements of one stage are arranged with respect to the birefringent elements of a second stage so that the polarization of light signals traveling from the first optical fiber to the second optical fiber aligned along the first optical polarization direction in the birefringent elements in the first stage is aligned along the second optical polarization direction in the first and second birefringent elements in the second stage. The result is that light in any polarization mode entering the isolator travels the same optical distance through the isolator; polarization mode dispersion through the optical isolator is substantially reduced.

BRIEF DESCRIPTION OF THE DRAWINGS

FIG. 3A illustrates the polarization of a light ray aligned in the ordinary direction in the birefringent polarizers of the first stage; FIG. 3B illustrates the polarization of a light ray aligned in the extraordinary direction in the birefringent polarizers of the first stage; FIG. 3C illustrates the polarization of a light ray aligned in the extraordinary direction in the birefringent polarizers of the second stage; FIG. 3D illustrates the polarization of a light ray aligned in the ordinary direction in the birefringent polarizers of the second stage.

DESCRIPTION OF THE PREFERRED EMBODIMENT(S)

Figure 1:
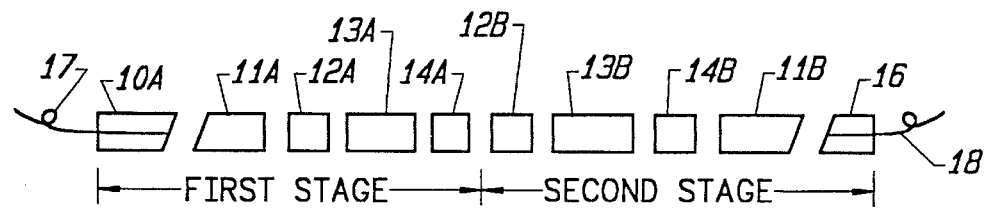
FIG. 1 is a representational diagram of a dual stage optical isolator in the prior art.

FIG. 1 represents a dual stage optical isolator of a type which uses the polarization modes of an incoming optical signal for one-way transmission. Such a dual stage optical isolator is described in U.S. Pat. No. 5,208,876, which issued May 4, 1993 to one of the inventors of the present application and assigned to the present assignee. The described dual-stage optical isolator has very high performance with isolation of greater than 60 dB. Nonetheless, no effort is directed toward reducing polarization mode dispersion.

In the optical isolator of FIG. 1, the first stage has a glass ferrule 10A which receives an input fiber 17. The ferrule 10A is followed by a GRIN (GRaded INdex) lens 11A, first polarizer 12A, Faraday rotator 13A, and second polarizer (analyzer) 14A. The second stage has a first polarizer 12B, Faraday rotator 13B, second polarizer 14B and a GRIN lens 11B. A glass ferrule 16 which holds an output fiber 18 completes the second stage.

The optical isolator is placed in the path of an optical fiber, here shown as the input fiber 17 and the output fiber 18, to transmit light signals from the input fiber 17 to the output fiber 18 and to block light signals from the output fiber 18 to the input fiber 17. In broad terms, the GRIN lens 11A collimates the light from the point-like core of the input fiber 17 into spread out, but parallel, light rays. The parallel light rays travel through the central elements of the isolator, the polarizers 12A, 14A, 12B and 14B, and the Faraday rotators 13A and 13B before being refocused by the second GRIN lens 11B into the core of the output fiber 18. Of course, standard collimating lenses may also be used in place of the GRIN lens 11A and 11B. Due to the action by the central elements on the different polarization modes of the light, optical signals from the input optical fiber 17 to the output optical fiber 18 are transmitted, while signals from the output fiber 18 to the input fiber 17 are blocked.

To better understand the present invention, the dual stage isolator is explained in terms of the details of a single stage of the isolator. For convenience, the first stage of the FIG. 1 isolator is selected to explain the operation of a stage in the forward direction and the second stage is selected to explain the operation of a stage in the reverse direction.

Figure 2A:
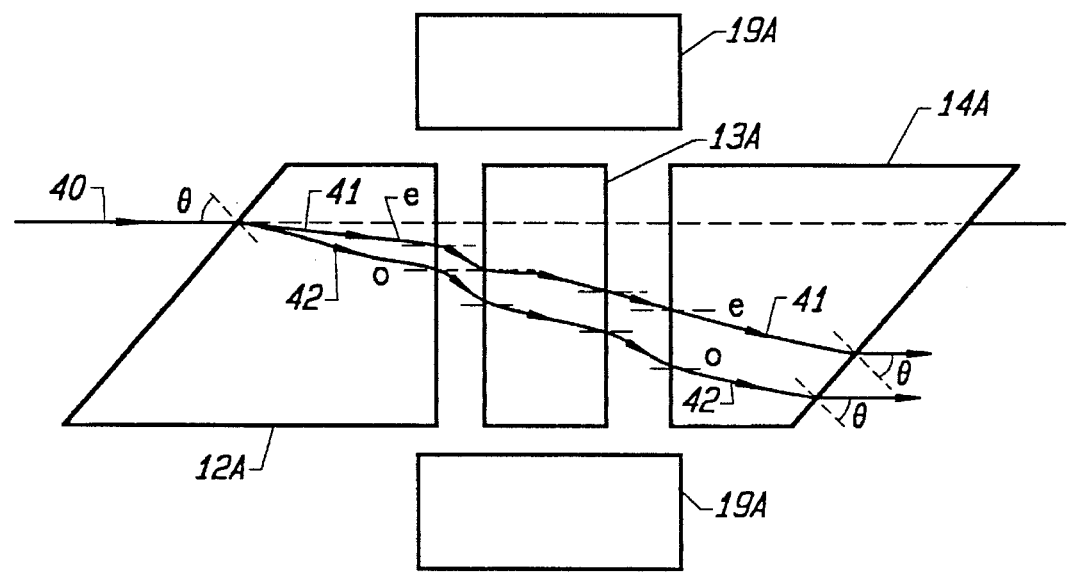
FIG. 2A illustrates a forward path of a light ray through the central elements of one of the stages of the optical isolator of FIG. 1.

After collimation by the GRIN lens 11A, signals from the end of the input fiber 17 are transmitted in parallel through the first polarizer 12A in the form of a birefringent crystal wedge, as shown in FIG. 2A. Lithium niobate is used as the birefringent material of the polarizers 12A and 14A (and 12B and 14B), though rutile, calcite, yttrium orthovanadate ($YVO_4$) or lithium tantalate ($LiTaO_3$) may also be used.

The polarizer 12A separates the incident light 40 from the GRIN lens 11A into a first component ray, represented by a ray 41 in FIG. 2A, which is polarized in its principal plane (which is defined by the optical axis of the polarizer 12A and the propagation direction of the light ray) and designated as the extraordinary ray, and a second ray, represented as a ray 42 in FIG. 2A, which is polarized perpendicular to its principal plane and designated the ordinary ray.

Separation occurs because the birefringent crystal has two indexes of refraction, one for the light polarized within its principal plane, $n_e$, and another for the light polarized perpendicularly to its principal place, $n_o$. The polarizations of both rays 41 and 42, i.e., the light from the polarizer 12A, are then rotated 45° by the Faraday rotator 13A. The rotator 13A is typically formed from garnet doped with impurities or, alternatively, YIG, CdMnTe (cadmium manganese tellurium, CdMnTe doped with Hg, or TGG (terbium gallium garnet). The rotator 13A is placed in a permanent magnet, symbolically illustrated by blocks 19A.

The second polarizer 14A, sometimes called an analyzer, the second polarizer 14A is formed by a birefringent crystal wedge, like the polarizer 12A. The optic axis of this birefringent crystal is oriented 45° with respect to the optic axis of the first polarizer 12A and in the same direction as the rotation caused by the rotator 13A. The polarization of the ray 41, representing the light component polarized along the extraordinary direction of the first polarizer 12A, is aligned with the extraordinary direction of the second polarizer 14A. Thus the same reference numeral is used for the ray 41 of the second polarizer 14A, representing the light polarized perpendicular its principal plane and its propagation direction.

Similarly the polarization of the ray 42, representing the light component polarized in its principal plane in the polarizer 12A, is aligned with the direction in its principal plane in the second polarizer 14A. The same ray reference numeral, 42, is used in the second polarizer 14A.

The net result is that after traveling from the first polarizer 12A through the second polarizer 14A, the two rays travel displaced from, but parallel to, each other. In a single stage isolator, the two rays are then combined and refocused by a second GRIN lens to the core end of an output fiber. In the present case the collimated light, i.e., the parallel rays, are passed to the isolator's second stage, which operates on the light in the same manner as the first stage, before being combined and refocused by the GRIN lens 11B.

Figure 2B:
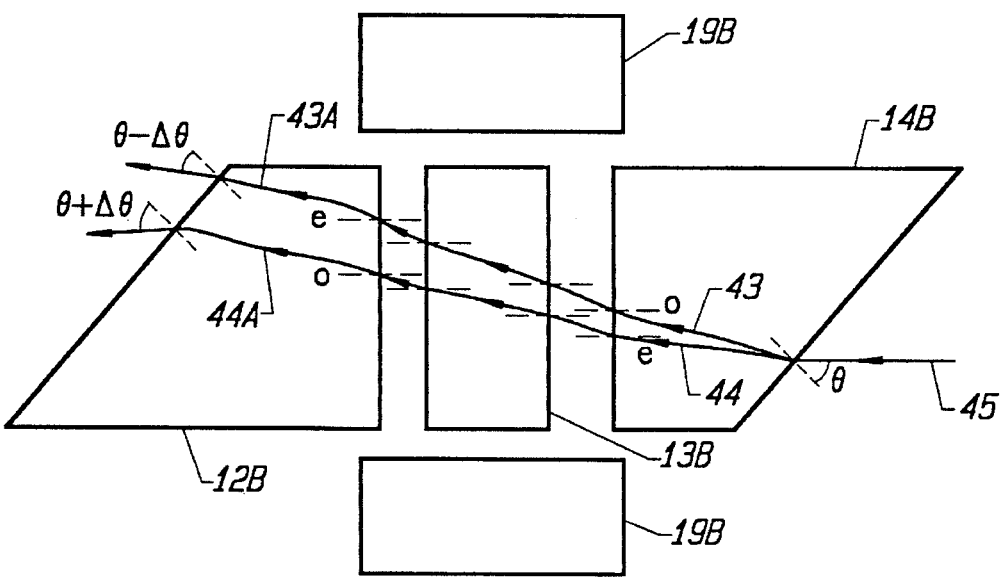
FIG. 2B illustrates a backward path of a light ray through the central elements of the stage in FIG. 2A.

In the reverse direction, light from the output fiber 18 is collimated by the second GRIN lens 11B before being passed to the second polarizer 14B. As shown in FIG. 2B, the light incident upon the polarizer 14B, represented by a ray 45, is separated by the polarizer 14B into two components, an ordinary ray 43 polarized perpendicular to its principal plane in the polarizer 14B, and an extraordinary ray 44 polarized within its principal plane in 14B. When passing back through the Faraday rotator 13B, the light in both rays 43 and 44 is rotated by 45°. This rotation is nonreciprocal with the rotation of light in the forward direction by the rotator 13B, i.e., rotation along the line of travel appears to be opposite in the reverse direction.

The polarization of the ray 43, representing the light component polarized perpendicular to its principal plane in 14B, is aligned with the direction within its principal plane in the first polarizer 12B. Thus the reference numeral 43A is used for the ray 43 in the first polarizer 12B to represent the light component polarized within its principal plane in the first polarizer 12B. Similarly the polarization of the ray 44, representing the light component polarized within its principal plane in the second polarizer 14B, is aligned with the direction perpendicular to its principal plane in the first polarizer 12B. The reference numeral 44A is used for the ray 44 in the first polarizer 12B to represent the light component polarized perpendicular to its principal plane in the first polarizer 12B. The ordinary and extraordinary rays 43 and 44 from the second polarizer 14B incident upon the first polarizer 12B have exchanged places.

Because of this exchange, the light, in passing through the first polarizer 12B, does not leave the first polarizer 12B in parallel rays. This is shown by the differing angles of refraction, $\theta \pm \Delta\theta$, for the two rays 43A and 44A leaving the polarizer 12B. The light from the first polarizer 12B is not parallel to the light direction entering the second polarizer 14B. In an isolator with a single stage, the non-parallel light is focused by the first GRIN lens 11A at points which are not located at the core end of the input fiber. In the dual stage isolator of the present invention, the non-parallel nature of the light from the second stage ensures that the light remains non-collimated by the first stage. Furthermore, since the first stage is an isolator itself, any parallel light is also blocked. Thus light in the reverse direction is not passed back into the input fiber.

For a more detailed description of this type of optical isolator using birefringent polarizers and details of its elements, see U.S. Pat. No. 5,208,876, cited above.

From the description above, it should be apparent that the isolation action of each stage of the dual stage optical isolator of FIG. 1 is independent of the polarization of the light signal in the fibers 17 and 18. That is, each stage operates as an isolator independently of the relationship of the orientation of the optical axes of the birefringent polarizers with respect the polarization of the light travelling through each stage and of the relationship of the orientation of the optical axes of the birefringent polarizers in the two stages.

The present invention recognizes that the path of split light rays due to the action of the birefringent polarizers through the optical isolator may have two different optical distances. Therefore, even though the light signals are recombined later by the second GRIN lens 11B, the combined signal now has one mode of polarization ahead of, or behind, the other mode. There is a time delay between the two polarization modes and the signal has become dispersed. As the signal travels through an optical fiber over long distances, the dispersion effect is increased. Furthermore, numerous optical repeaters with isolators in the fiber optical network further compound the problem.

In accordance with the present invention, the birefringent polarizers of the isolator stages are arranged so that each polarization mode of the light signal travels the same optical distance through the isolator. Each light component travels the same optical distance no matter how the component's polarization is aligned with the optical axes of the birefringent polarizers. The optical axes of the birefringent polarizers of each stage maintain the same orientation with respect to each other. The optical isolation function of each stage is preserved. However, the orientation of the optical axes of the birefringent polarizers of each stage with respect to the other stage is arranged so that a polarization mode along one direction, say, the ordinary direction, of a light ray in the first stage is aligned along the opposite, extraordinary, direction in the second stage. The light component of polarization along the extraordinary direction in the first stage is aligned along the ordinary direction in the second stage. In this manner, light in any polarization state always travels the same optical distance through the isolator.

Furthermore, the Faraday rotators 13A and 13B of each stage rotate the linear polarization of light in a particular direction by the same amount, but in opposite directions. This preserves the state of polarization of the light from the input fiber to the output fiber and may be important if an optical device downstream of the isolator is dependent upon the state of polarization of the light. It should be noted that most of the single stage isolators of the type described rotate linearly polarized light by 45°.

Figure 3A:
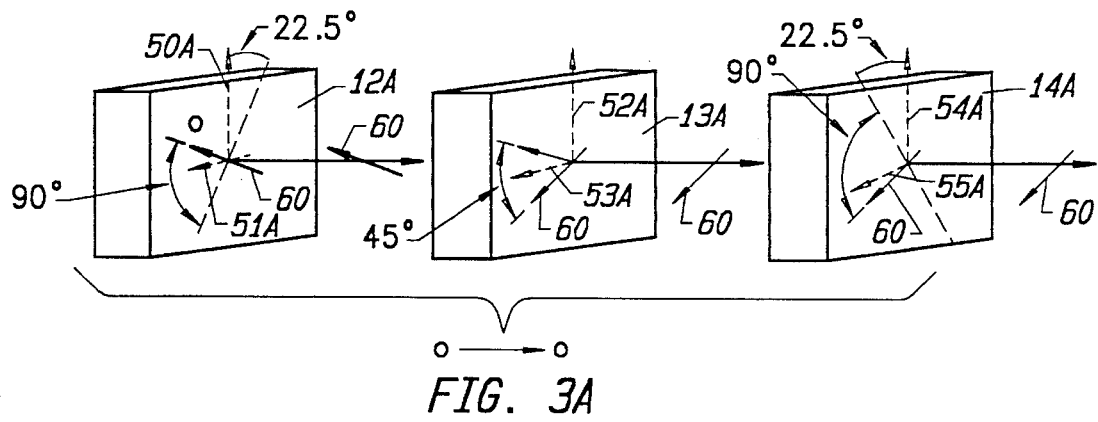
FIGS. 3A–3D illustrate the forward path of light rays in the birefringent polarizers of the dual stage optical isolator of FIG. 1 according to the present invention.
Figure 3B:
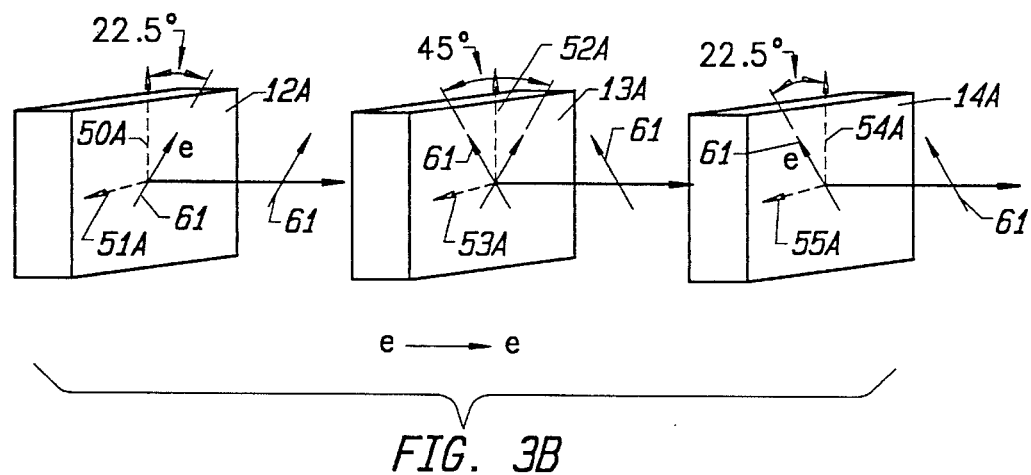
Figure 3C:
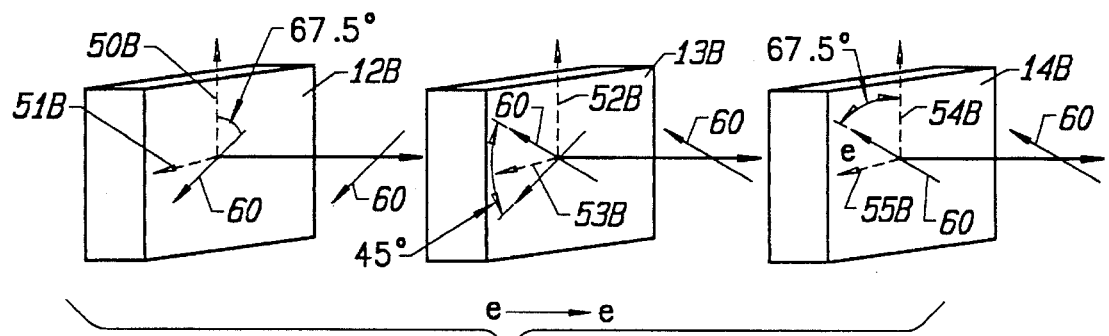
Figure 3D:
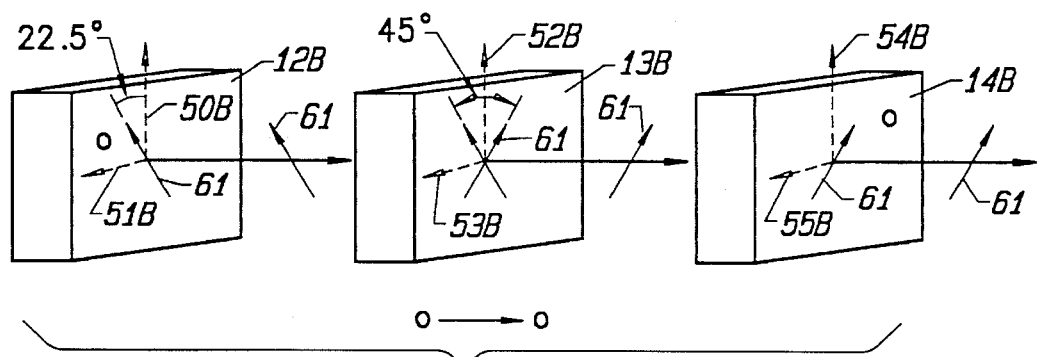

A detailed description of the operation of the polarizers upon light in the forward direction according to the present invention is illustrated in FIGS. 3A–3D. FIGS. 3A and 3B illustrate the operation of the first stage and FIGS. 3C and 3D illustrate the operation of the second stage. It should be noted that "vertical" and "horizontal" axes are used as directional references for the polarizers 12A, 12B, 14A and 14B and Faraday rotators 13A and 13B in the drawings. The angled faces of the polarizers are not shown for illustrative simplicity. Rotation is defined by the direction of travel and the "right-hand" rule.

As shown in FIG. 3A, the optical axis of the first polarizer 12A of lithium niobate is 22.5° from the vertical axis 50A of the polarizer 12A. The polarization of the ordinary light component is then perpendicular to the principal plane of the polarizer 12A and 22.5° above the horizontal axis 51A of the polarizer. The polarization direction of the ordinary light component in the first polarizer 12A is shown by a solid arrow 60. To keep track of this component the same reference numeral is used in FIGS. 3A and 3C. The Faraday rotator 13A rotates the polarization of the ordinary ray by +45°. The rotation is shown by the orientation of the arrow 60 leaving the rotator 13A, which is now 22.5° below the horizontal axis 53A of the rotator. The ordinary direction in the second polarizer 14A is aligned parallel, i.e., 22.5° below the horizontal axis 55A of the polarizer 14A, to the polarization of this light component from the rotator 13A. This polarization, represented by the arrow 60, of this light component from the second polarizer 14A is polarized 22.5° below the horizontal axis 55A.

The polarization of the light component polarized along the extraordinary direction, and parallel to the principal plane, in the first polarizer 12A is shown by a solid arrow 61 in FIG. 3B. The Faraday rotator 13A rotates the polarization by +45° so that the polarization, as shown by the arrow 61, is aligned with the extraordinary direction in the second polarizer 14A. Thus the polarization of this component from the second polarizer 14A is polarized 22.5° from the vertical axis 54A.

FIGS. 3C and 3D illustrate the operation of the second stage of the optical isolator in the forward direction. Note that the orientation of the optical axes of the second stage polarizers 12B and 14B is rotated with respect to the optical axes of the first stage polarizers 12A and 14A. On the other hand, the orientation of the optical axes of the second stage polarizers is maintained with respect to each other to preserve the isolation operation of the second stage.

The polarization of the light component previously aligned with the ordinary direction in the first stage polarizers 12A and 14A and represented by the solid arrow 6O is aligned with the extraordinary direction of the polarizer 12B. This is shown in FIG. 3C. From the first polarizer 12B the polarization is rotated by the Faraday rotator 13B by −45°, opposite to the rotation of the first stage Faraday rotator 13A. The rotated polarization is 22.5° above the horizontal axis 53B. The extraordinary direction in the second polarizer 14B of the second stage is aligned in this direction so that the light component polarization represented by the arrow 60 is along the extraordinary direction in the polarizer 14B. In this manner this light component travels through the first stage of the optical isolator according to the ordinary index of refraction, $n_o$, and through the second stage according to the extraordinary index of refraction, $n_e$.

In a similar fashion the light component polarization previously aligned in the extraordinary direction in the first stage polarizers 12A and 14A and represented by the solid arrow 61 is aligned with the ordinary direction in the polarizer 12B. This is shown in FIG. 3D. the polarization of the light component from the first polarizer 12B is rotated by the Faraday rotator 13B by −45° so that the polarization of the rotated light component is 22.5° off the vertical axis 52B. The ordinary direction in the second polarizer 14B of the second stage is aligned with the light component polarization represented by the arrow 61. In this manner this light component travels through the first stage of the optical isolator according to the extraordinary index of refraction, $n_e$, and through the second stage according to the ordinary index of refraction, $n_o$.

Thus the light of both polarization modes, represented by the arrows 60 and 61, travel the same optical distances through the two stages of the optical isolator, since the physical parameters of the two stages are identical. The result is that there is no time delay through the isolator between these two light components of the signal entering the isolator. Polarization mode dispersion is substantially reduced or eliminated. Because the two stages of the isolator are made of the same material, this compensation for polarization mode dispersion is achieved over a wide range of wavelengths and temperatures.

Furthermore, since the Faraday rotators of the two stages operate in the opposite direction, the light signal entering the isolator undergoes no rotation. The light signal leaving the isolator is polarized in the same directions as the light signal entering the isolator.

Figure 4A:
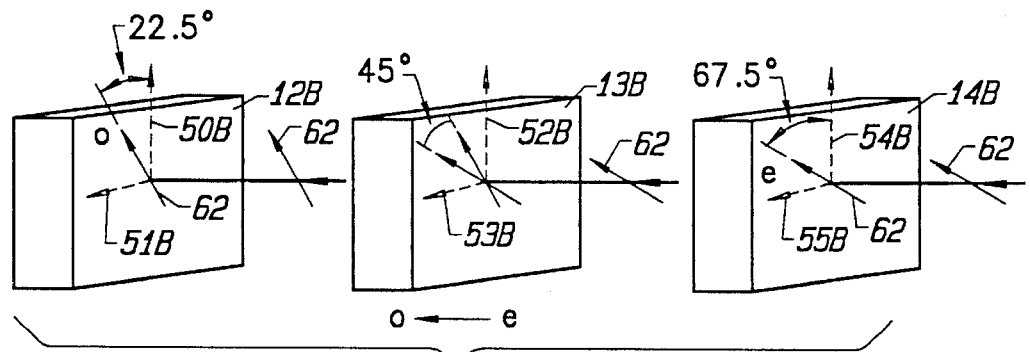
FIGS. 4A–4D illustrate the backward path of light rays in the birefringent polarizers of the dual stage optical isolator of FIG. 1 according to the present invention.
Figure 4B:
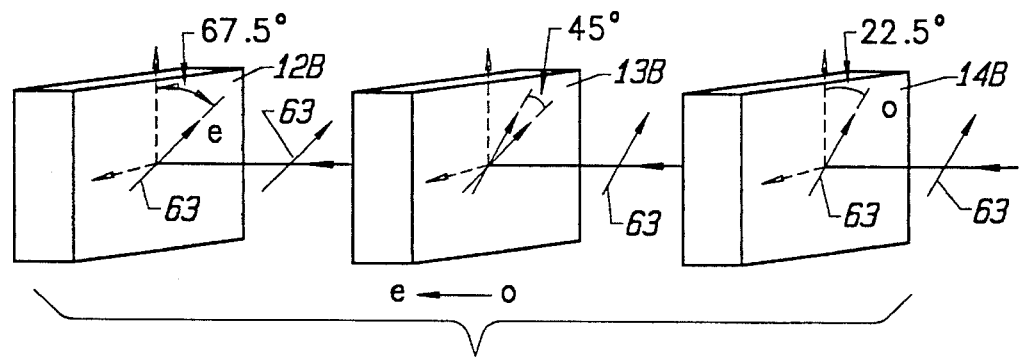
Figure 4C:
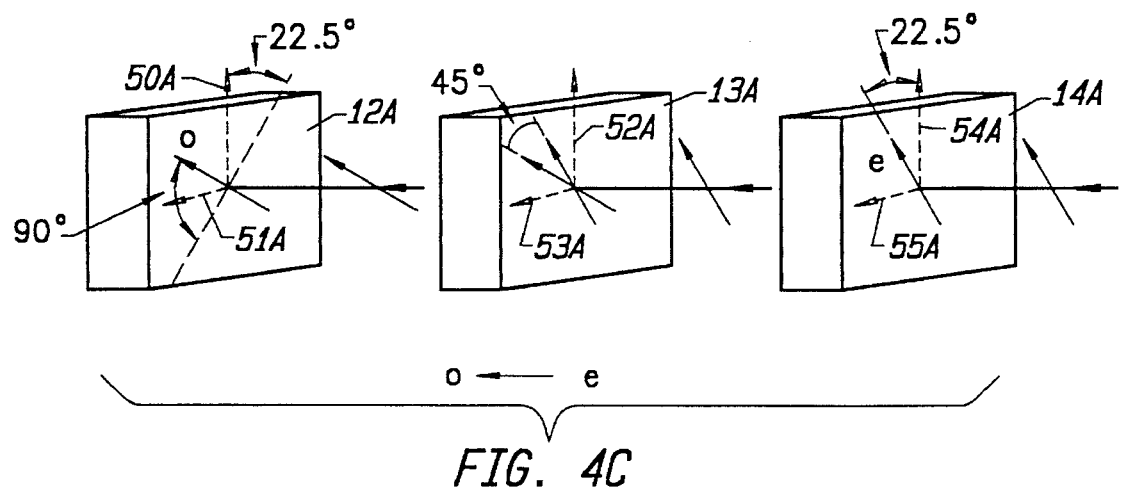
Figure 4D:
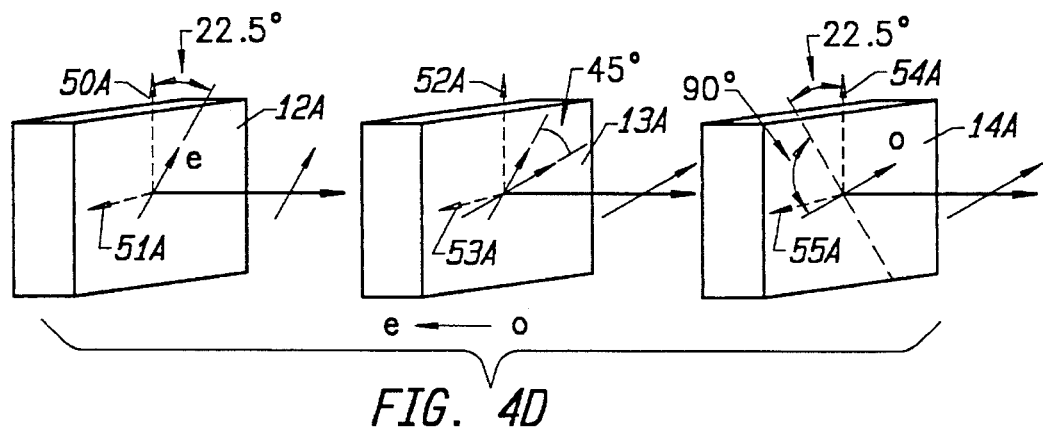

FIGS. 4A–4D demonstrate that each of the stages of still operates as an isolator. FIG. 4A and 4B illustrate the second stage of the isolator for light travelling in the reverse direction, i.e., light from the output fiber 18 toward the input fiber 17; FIGS. 4C and 4D illustrate the first stage of the isolator for light travelling in the reverse direction.

The light component polarized along the extraordinary direction in the second polarizer 14B (shown by the solid arrow 62), which as previously described is oriented 67.5° from the vertical axis 54B, is rotated −45° by the Faraday rotator 13B, as shown in FIG. 4A. The polarization of this extraordinary light component is oriented 22.5° from the vertical axis 50B, i.e., aligned with the ordinary direction axis in the first polarizer 12B. Similarly FIG. 4B illustrates that how the polarization 63 of the light component polarized along the ordinary direction in the second polarizer 14B is rotated −45° by the Faraday rotator 13B. The polarization 63 of the light from the second polarizer 14B is aligned with the extraordinary direction, oriented 67.5° from the vertical axis 50B, in the first polarizer 12B.

Likewise, the operation of the first stage is the same as the second stage for light signals in the reverse direction. That is, the polarization of the light component in the extraordinary direction in the second polarizer 14A becomes aligned with the ordinary direction in the first polarizer 12A (FIG. 4C) and the polarization of the light component in the ordinary direction in the second polarizer 14A becomes aligned with the extraordinary direction in the first polarizer 12A (FIG. 4D).

In other words, the polarization modes of the light in the ordinary and extraordinary directions in the second polarizer 14B and 14A are aligned along the extraordinary and ordinary directions in the first polarizer 12B and 12A respectively. As explained with respect to FIG. 2B, this exchange of ordinary and extraordinary directions in each stage causes a deflection of each polarization mode from the original direction of travel of the light entering the second polarizer 14B and 14A. The deflected light prevents a refocussing of the light back into an optical fiber. The net effect is that each stage remains an optical isolator, transmitting light signals in the forward direction and blocking signals in the reverse direction.

While the above is a complete description of the preferred embodiments of the present invention, various alternatives, modifications and equivalents may be used. It should be evident that the present invention is equally applicable by making appropriate modifications to the embodiment described above. Therefore, the above description should not be taken as limiting the scope of invention which is defined by the metes and bounds of the appended claims.

What is claimed is:

1. An optical isolator for connecting first and second optical fibers and transmitting optical signals from said first optical fiber to said second optical fiber and blocking optical signals from said second optical fiber to said first optical fiber, said isolator comprising:

a pair of optical isolator stages, each stage having a rotator and first and second birefringent elements, each birefringent element having a first polarization direction and a second polarization direction, said birefringent elements arranged with respect to said rotator so that polarization of light signals traveling from said first optical fiber to said second optical fiber aligned along said first polarization direction in the first birefringent element is rotated and aligned along said first polarization direction in the second birefringent element and so that polarization of light signals traveling from said second optical fiber to said first optical fiber aligned along said first polarization direction in said second birefringent element is rotated and aligned along said second polarization direction in said first birefringent element, each optical isolator stage operating as an optical isolator; and said birefringent elements of a first stage arranged with respect to said birefringent elements of a second stage so that polarization of light signals traveling from said first optical fiber to said second optical fiber aligned along said first polarization direction in said first and second birefringent elements in said first stage is aligned along said second optical polarization direction in said first and second birefringent elements in said second stage;

whereby polarization mode dispersion through said optical isolator is substantially reduced.

2. The optical isolator of claim 1 wherein said rotator in said second stage operates to cancel the effect of said rotator in said first stage so that the polarization of light signals in said first optical fiber is unchanged in said second optical fiber.

3. The optical isolator of claim 2 wherein said rotator in said first stage rotates the polarization of light in a first direction by a predetermined amount and said rotator in said second stage rotates the polarization of light in a direction opposite to said first direction by said predetermined amount.

4. The optical isolator as in claim 1 wherein said birefringent elements comprise lithium niobate.

5. The optical isolator as in claim 1 wherein said birefringent elements comprise rutile.

6. The optical isolator as in claim 1 wherein said birefringent elements comprise calcite.

7. The optical isolator as in claim 1 wherein said birefringent elements comprise lithium tantalate.

8. The optical isolator as in claim 1 wherein said birefringent elements comprise yttrium orthovanadate.

9. The optical isolator as in claim 1 wherein said birefringent elements of said optical isolator stages comprise the same material.

10. An optical isolator for connecting first and second optical fibers and transmitting optical signals from said first optical fiber to said second optical fiber and blocking optical signals from said second optical fiber to said first optical fiber, said optical isolator having birefringent polarizers with a first index of refraction associated with a first optical polarization direction and a second index of refraction associated with a second optical polarization direction, said first optical polarization direction perpendicular to said second optical polarization direction, said optical isolator comprising a first stage having a first GRIN lens connected to said first optical fiber, a first birefringent polarizer, a Faraday rotator, a second birefringent polarizer, said first and second birefringent polarizers and Faraday rotator arranged with respect to each other so that polarization of light from said first optical fiber aligned in said first polarization direction in said first birefringent polarizer is aligned in said first polarization direction in said second birefringent polarizer after rotation by said Faraday rotator;

a second stage having a first birefringent polarizer, a Faraday rotator, a second birefringent polarizer, a second GRIN lens connected to said second optical fiber, said first and second birefringent polarizers and Faraday rotator arranged with respect to each other and to said first stage so that polarization of light from said second birefringent polarizer of said first stage aligned in said first polarization direction of said second birefringent polarizer of said first stage is aligned in said second polarization direction in said first birefringent polarizer of said second stage, and polarization of light aligned in said second polarization direction in said first birefringent polarizer of said second stage is aligned in said second polarization direction in said second birefringent polarizer of said second stage after rotation by said Faraday rotator of said second stage;

whereby light in any polarization mode travels the same optical distance through said isolator and polarization mode dispersion through said isolator is reduced.

11. The optical isolator as in claim 10 wherein said birefringent polarizers comprise lithium niobate.

12. The optical isolator as in claim 10 wherein said birefringent polarizers comprise rutile.

13. The optical isolator as in claim 10 wherein said birefringent polarizers comprise calcite.

14. The optical isolator as in claim 10 wherein said birefringent polarizers comprise lithium tantalate.

15. The optical isolator as in claim 10 wherein said birefringent polarizers comprise yttrium orthovanadate.

16. The optical isolator as in claim 10 wherein said birefringent polarizers of said optical isolator stages comprise the same material.

17. The optical isolator as in claim 10 wherein said Faraday rotators in said first and second stages operate in equal, but opposite, directions.

18. A polarization mode dispersion compensating optical isolator comprising:

a first optical isolation stage having an input and an output, wherein an optical signal which enters the output is substantially blocked from reaching the input, and wherein an optical signal which enters the input passes to the output with a first polarization mode dispersion; and a second optical isolation stage having an input and an output, wherein an optical signal which enters the output is substantially blocked from reaching the input, and wherein an optical signal which enters the input passes to the output with a second polarization mode dispersion;

wherein the input of the second stage is optically coupled to the output of the first stage, and wherein the second stage is oriented relative to the first stage so that the second polarization mode dispersion counteracts the first polarization mode dispersion.

19. A polarization mode dispersion compensating optical isolator as claimed in claim 18, wherein the first polarization mode dispersion is substantially equal to the second polarization mode dispersion so that there is substantially no polarization mode dispersion from the input of the first stage to the output of the second stage.

20. An optical isolator comprising:

first and second isolator stages, each stage comprising an input, an output, and first and second polarization direction optical paths from the input to the output, wherein the first path is optically longer than the second path, and wherein optical signals from the output are blocked from the input;

wherein the output of the first stage is optically coupled to the input of the second stage, and wherein the second stage is oriented relative to the first stage so that a portion of a signal which travels the first path within the first stage travels the second path within the second stage.

21. An optical isolator as in claim 20, wherein an alternate portion of the signal which travels the second path within the first stage travels the first path within the second stage.

22. An optical isolator as in claim 21, wherein each stage further comprises a first birefringent polarizer to change the angle of the first path relative to the second path, a rotator to realign polarization directions of the first and second paths from the first polarizer, and a second birefringent polarizer to angularly align the first and second paths from the rotator.

* * * * *

(12) REEXAMINATION CERTIFICATE (4697th)
United States Patent
Pan et al.

(10) Number: US 5,566,259 C1
(45) Certificate Issued: Dec. 31, 2002

(54) DUAL STAGE OPTICAL DEVICE WITH LOW POLARIZATION MODE DISPERSION

(75) Inventors: Jing-Jong Pan, Milpitas, CA (US); Ming Shih, Milpitas, CA (US); Jingyu Xu, San Jose, CA (US)

(73) Assignee: E-Tek Dynamics, Inc., San Jose, CA (US)

Reexamination Request:
No. 90/005,680, Mar. 16, 2000

Reexamination Certificate for:
Patent No.: 5,566,259
Issued: Oct. 15, 1996
Appl. No.: 08/354,706
Filed: Dec. 13, 1994

(51) Int. Cl.$^7$ ................................................ G02B 6/27
(52) U.S. Cl. ........................... 385/11; 359/497; 385/15; 385/31
(58) Field of Search ............................... 385/11, 15, 27, 385/31–35, 39; 359/487, 488, 494, 497–501

(56) References Cited

U.S. PATENT DOCUMENTS 5,208,876 A   5/1993 Pan ................................ 385/11
5,237,445 A   8/1993 Kuzuta ......................... 359/281

FOREIGN PATENT DOCUMENTS

JP          6-11664          1/1994

*Primary Examiner*—John D. Lee

(57) ABSTRACT

The present invention provides for a two-stage optical isolator with reduced polarization mode dispersion. Each stage has two birefringent polarizers separated by a Faraday rotator. The polarizers in each stage are oriented with respect to each other to operate conventionally as an optical isolator for light in a backward direction. However, the polarizers in each stage are oriented with respect to the polarizers in the other stage so that a polarization mode along one direction, say, the ordinary direction, of light in the first stage travelling toward the second stage is aligned along the opposite, extraordinary, direction in the second stage and vice versa. In this manner the component of any polarization travels the same optical distance through the optical isolator to substantially reduce polarization mode dispersion.

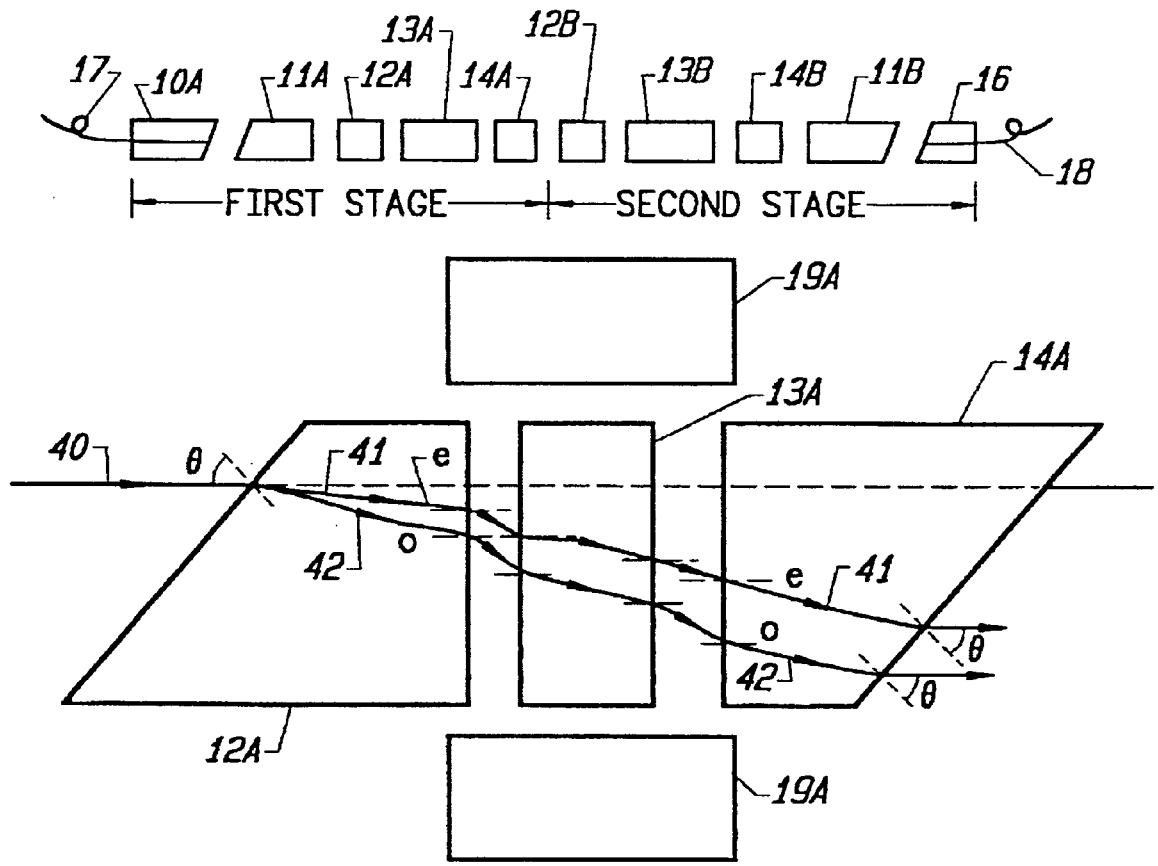

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–6, 9–13 and 16–22 are cancelled.

Claims 7, 8, 14 and 15 are determined to be patentable as amended.

7. [The] *An* optical isolator [as in claim 1] *for connecting first and second optical fibers and transmitting optical signals from said first optical fiber to said second optical fiber and blocking optical signals from said second optical fiber to said first optical fiber, said isolator comprising:*

*a pair of optical isolator stages, each stage having a rotator and first and second birefringent elements, each birefringent element having a first polarization direction and a second polarization direction, said birefringent elements arranged with respect to said rotator so that polarization of light signals traveling from said first optical fiber to said second optical fiber aligned along said first polarization direction in the first birefringent element is rotated and aligned along said first polarization direction in the second birefringent element and so that polarization of light signals traveling from said second optical fiber to said first optical fiber aligned along said first polarization direction in said second birefringent element is rotated and aligned along said second polarization direction in said first birefringent element, each optical isolator stage operating as an optical isolator; and*

*said birefringent elements of a first stage arranged with respect to said birefringent elements of a second stage so that polarization of light signals traveling from said first optical fiber to said second optical fiber aligned along said first polarization direction in said first and second birefringent elements in said first stage is aligned along said second optical polarization direction in said first and second birefringent elements in said second stage;*

*whereby polarization mode dispersion through said optical isolator is substantially reduced,* wherein said birefringent elements comprise lithium tantalate.

8. [The] *An* optical isolator [as in claim 1] *for connecting first and second optical fibers and transmitting optical signals from said first optical fiber to said second optical fiber and blocking optical signals from said second optical fiber to said first optical fiber, said isolator comprising:*

*a pair of optical isolator stages, each stage having a rotator and first and second birefringent elements, each birefringent element having a first polarization direction and a second polarization direction, said birefringent elements arranged with respect to said rotator so that polarization of light signals traveling from said first optical fiber to said second optical fiber aligned along said first polarization direction in the first birefringent element is rotated and aligned along said first polarization direction in the second birefringent element and so that polarization of light signals traveling from said second optical fiber to said first optical fiber aligned along said first polarization direction in said second birefringent element is rotated and aligned along said second polarization direction in said first birefringent element, each optical isolator state operating as an optical isolator; and*

*said birefringent elements of a first stage arranged with respect to said birefringent elements of a second stage so that polarization of light signals traveling from said first optical fiber to said second optical fiber aligned along said first polarization direction in said first and second birefringent elements in said first stage is aligned along said second optical polarization direction in said first and second birefringent elements in said second stage;*

*whereby polarization mode dispersion through said optical isolator is substantially reduced* wherein said birefringent elements comprise yttrium orthovanadate.

14. [The] *An* optical isolator [as in claim 10] *for connecting first and second optical fibers and transmitting optical signals from said first optical fiber to said second optical fiber and blocking optical signals from said second optical fiber to said first optical fiber, said optical isolator having birefringent polarizers with a first index of refraction associated with a first optical polarization direction and a second index of refraction associated with a second optical polarization direction, said first optical polarization direction perpendicular to said second optical polarization direction, said optical isolator comprising*

*a first stage having a first GRIN lens connected to said first optical fiber, a first birefringent polarizer, a Faraday rotator, a second birefringent polarizer, said first and second birefringent polarizers and Faraday rotator arranged with respect to each other so that polarization of light from said first optical fiber aligned in said first polarization direction in said first birefringent polarizer is aligned in said first polarization direction in said second birefringent polarizer after rotation by said Faraday rotator;*

*a second stage having a first birefringent polarizer, a Faraday rotator, a second birefringent polarizer, a second GRIN lens connected to said second optical fiber, said first and second birefringent polarizers and Faraday rotator arranged with respect to each other and to said first stage so that polarization of light from said second birefringent polarizer of said first stage aligned in said first polarization direction of said second birefringent polarizer of said first stage is aligned in said second polarization direction in said first birefringent polarizer of said second stage, and polarization of light aligned in said second polarization direction in said first birefringent polarizer of said second stage is aligned in said second polarization direction in said second birefringent polarizer of said second stage after rotation by said Faraday rotator of said second stage;*

*whereby light in any polarization mode travels the same optical distance through said isolator and polarization mode dispersion through said isolator is reduced* wherein said birefringent polarizers comprise lithium tantalate.

15. [The] *An* optical isolator [as in claim 10] *for connecting first and second optical fibers and transmitting optical* signals from said first optical fiber to said second optical fiber and blocking optical signals from said second optical fiber to said first optical fiber, said optical isolator having birefringent polarizers with a first index of refraction associated with a first optical polarization direction and a second index of refraction associated with a second optical polarization direction, said first optical polarization direction perpendicular to said second optical polarization direction, said optical isolator comprising a first stage having a first GRIN lens connected to said first optical fiber, a first birefringent polarizer, a Faraday rotator, a second birefringent polarizer, said first and second birefringent polarizers and Faraday rotator arranged with respect to each other so that polarization of light from said first optical fiber aligned in said first polarization direction in said first birefringent polarizer is aligned in said first polarization direction in said second birefringent polarizer after rotation by said Faraday rotator;

a second stage having a first birefringent polarizer, a Faraday rotator, a second birefringent polarizer, a second GRIN lens connected to said second optical fiber, said first and second birefringent polarizers and Faraday rotator arranged with respect to each other and to said first stage so that polarization of light from said second birefringent polarizer of said first stage aligned in said first polarization direction of said second birefringent polarizer of said first stage is aligned in said second polarization direction in said first birefringent polarizer of said second stage, and polarization of light aligned in said second polarization direction in said first birefringent polarizer of said second stage is aligned in said second polarization direction in said second birefringent polarizer of said second stage after rotation by said Faraday rotator of said second stage;

whereby light in any polarization mode travels the same optical distance through said isolator and polarization mode dispersion through said isolator is reduced wherein said birefringent polarizers comprise yttrium orthovanadate.

* * * * *

(12) EX PARTE REEXAMINATION CERTIFICATE (5324th)
United States Patent
Pan et al.

(10) Number: US 5,566,259 C2
(45) Certificate Issued: Apr. 4, 2006

(54) DUAL STAGE OPTICAL DEVICE WITH LOW POLARIZATION MODE DISPERSION

(75) Inventors: Jing-Jong Pan, Milpitas, CA (US); Ming Shih, Milpitas, CA (US); Jingyu Xu, San Jose, CA (US)

(73) Assignee: JDS Uniphase Corporation, San Jose, CA (US)

Reexamination Request:
No. 90/006,526, Jan. 24, 2003

Reexamination Certificate for:
Patent No.: 5,566,259
Issued: Oct. 15, 1996
Appl. No.: 08/354,706
Filed: Dec. 13, 1994

Reexamination Certificate C1 5,566,259 issued Dec. 31, 2002

(51) Int. Cl.
*G02B 6/27* (2006.01)

(52) U.S. Cl. .............................. 385/11; 385/15; 385/31; 359/497

(58) Field of Classification Search .................. 385/11, 385/15, 27, 31, 32, 33, 34, 35; 359/487, 488, 359/494, 497, 498, 499, 500, 501
See application file for complete search history.

(56) References Cited

U.S. PATENT DOCUMENTS

| 4,473,634 A | 9/1984 | Dodds et al. | 430/272 |
| 5,000,546 A | 3/1991 | Saito et al. | 350/378 |

FOREIGN PATENT DOCUMENTS

| JP | 6-11664 | 1/1994 | 385/36 |

OTHER PUBLICATIONS

Van Nostrand Rienhold Encyclopedia of Chemistry, Forth Edition, pp. 960–962, 1984.

*Primary Examiner*—Brian M. Healy

(57) ABSTRACT

The present invention provides for a two-stage optical isolator with reduced polarization mode dispersion. Each stage has two birefringent polarizers separated by a Faraday rotator. The polarizers in each stage are oriented with respect to each other to operate conventionally as an optical isolator for light in a backward direction. However, the polarizers in each stage are oriented with respect to the polarizers in the other stage so that a polarization mode along one direction, say, the ordinary direction, of light in the first stage travelling toward the second stage is aligned along the opposite, extraordinary, direction in the second stage and vice versa. In this manner the component of any polarization travels the same optical distance through the optical isolator to substantially reduce polarization mode dispersion.

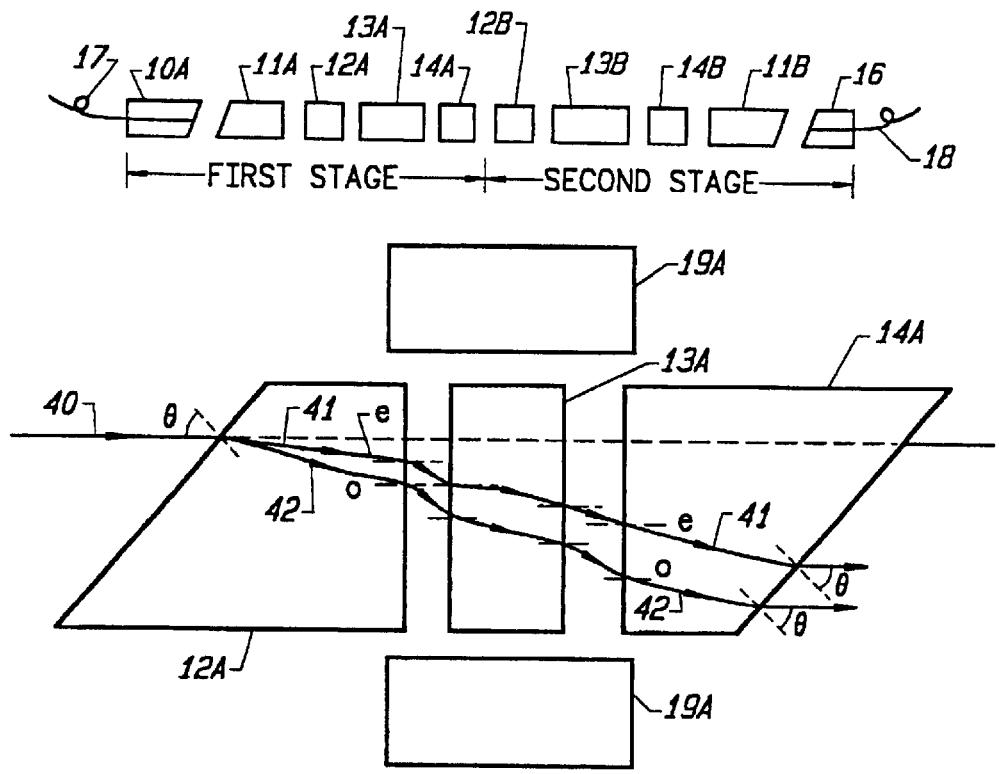

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7, 14 and 15 is confirmed.

Claims 1–6, 9–13 and 16–22 were previously cancelled.

Claim 8 is cancelled.

\* \* \* \* \*